US00RE35452E

United States Patent [19]

Sargeant

[11] E Patent Number: Re. 35,452

[45] Reissued Date of Patent: Feb. 18, 1997

[54] SINGLE POINT TRIANGULAR ADJUSTMENT SYSTEM FOR SANDALS

[75] Inventor: Lawrence B. Sargeant, Little Falls, N.Y.

[73] Assignee: Wolverine World Wide, Inc., Rockford, Mich.

[21] Appl. No.: 504,518

[22] Filed: Jul. 20, 1995

Related U.S. Patent Documents

Reissue of:

[64] Patent No.: 5,228,216
Issued: Jul. 20, 1993
Appl. No.: 848,834
Filed: Mar. 10, 1992

[51] Int. Cl.[6] ..... A43B 3/12

[52] U.S. Cl. ..... 36/11.5; 36/7.5

[58] Field of Search ..... 36/7.5, 7.6, 11.5, 36/58.5

[56] References Cited

U.S. PATENT DOCUMENTS

| | | | |
|---|---|---|---|
| D. 166,025 | 2/1952 | Braun | D7/7 |
| D. 167,737 | 9/1952 | Braun | D7/7 |
| 950,862 | 3/1910 | Nelson . | |
| 1,407,992 | 2/1922 | Doody | 36/11.5 |
| 1,463,672 | 7/1923 | Carrington | 36/11.5 |
| 1,652,354 | 12/1927 | Grubs . | |
| 1,807,792 | 6/1931 | Miller et al. | 36/58.5 |
| 1,894,561 | 1/1933 | Guiffre | 36/11.5 |
| 1,954,569 | 4/1934 | League | 36/7.6 |
| 1,964,705 | 6/1934 | Pellkofer | 36/11.5 |
| 2,081,375 | 5/1937 | Hartman et al. | 36/7.5 |
| 2,262,680 | 11/1941 | Hosker | 36/11.5 |
| 2,642,677 | 6/1953 | Yates | 36/11.5 |
| 2,685,141 | 8/1954 | Davenport | 36/7.6 |
| 3,407,517 | 10/1968 | Gessner | 36/11.5 |
| 3,800,444 | 4/1974 | Young | 36/11.5 |
| 3,978,596 | 9/1976 | Brown et al. | 36/11.5 |
| 4,079,527 | 3/1978 | Antonious | 36/51 |
| 4,200,997 | 5/1980 | Scheinhaus et al. | 36/11.5 |
| 4,226,031 | 10/1980 | Wong | 36/11.5 |
| 4,275,512 | 6/1981 | Zeligman et al. | 36/11.5 |
| 4,294,023 | 10/1981 | Banford | 36/11.5 |
| 4,353,172 | 10/1982 | Bryant | 36/7.6 |
| 4,446,633 | 5/1984 | Scheinhaus et al. | 36/11.5 |
| 4,584,782 | 4/1986 | Thatcher | 36/11.5 |
| 4,677,767 | 7/1987 | Darby | 36/11.5 |
| 4,793,075 | 12/1988 | Thacher | 36/11.5 |
| 4,817,302 | 4/1989 | Saltsman | 36/11.5 |
| 4,869,000 | 9/1989 | York, Jr. | 36/11.5 |

FOREIGN PATENT DOCUMENTS

| | | | |
|---|---|---|---|
| 1947245 | 3/1971 | Germany . | |
| 349631 | 8/1937 | Italy . | |
| 295260 | 7/1963 | Netherlands | 36/11.5 |
| 77921 | 6/1918 | Switzerland . | |
| 17450 | of 1901 | United Kingdom | 36/11.5 |

*Primary Examiner*—Marie D. Patterson
*Attorney, Agent, or Firm*—Warner Norcross & Judd

[57] ABSTRACT

A novel sport sandal construction capable of immediate tightening or loosening adjustment of all strap portions relative to the foot, with one quick adjustment. A control strap is anchored to a ring on one side of the sole at the ankle region, extends forwardly with a slip fit through a centrally located ring on the forefoot strap at the metatarsal region, then rearwardly to an anchor strap ring on a second anchor strap at the outside of the sole, and then through this ring with a slip fit to double back forwardly and overlap the rearwardly extending portion, where it is adjustably fastened with hook and loop fastener strips. A heel strap also extends between the two anchor strap rings. A simple length adjustment of this control strap simultaneously adjusts not only the length and position of both strap portions on both sides of the foot, but also adjusts the distance between the heel strap and the center of the forefoot strap.

14 Claims, 1 Drawing Sheet

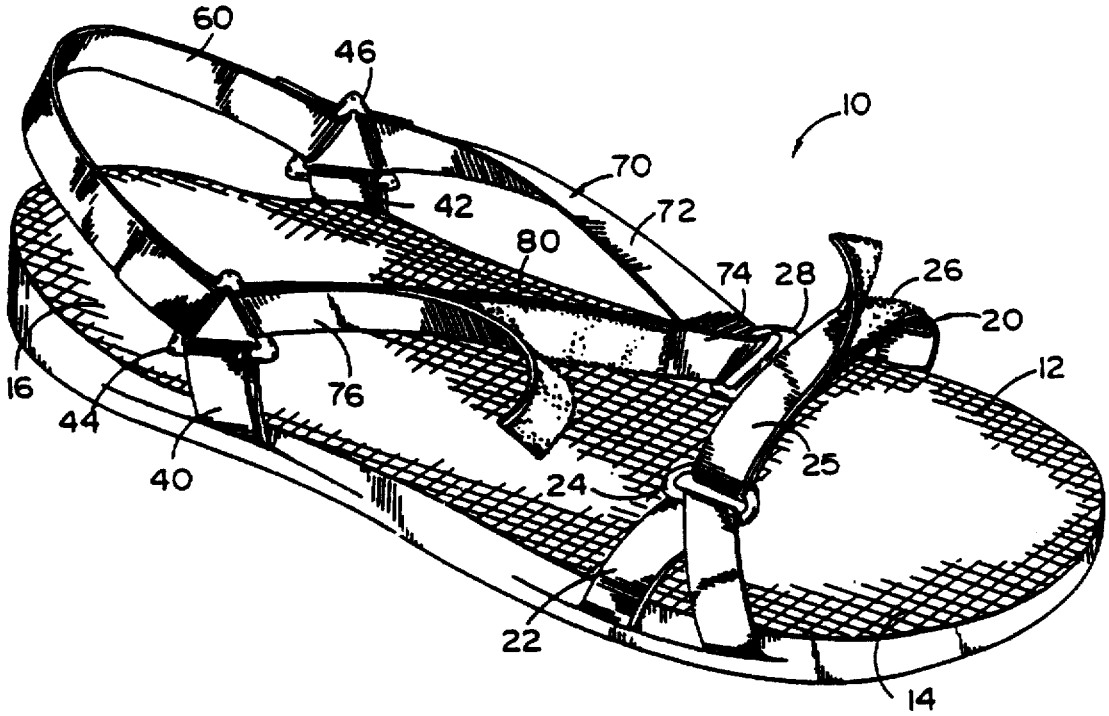
60
46
10
70
42
72
80
74
28
26
20
12
16
44
76
25
40
24
22
14

SINGLE POINT TRIANGULAR ADJUSTMENT SYSTEM FOR SANDALS

Matter enclosed in heavy brackets [ ] appears in the original patent but forms no part of this reissue specification; matter printed in italics indicates the additions made by reissue.

*This application is a Reissue of application* 07/848,834, now U.S. Pat. No. 5,228,216.

BACKGROUND OF THE INVENTION

This invention relates to sports sandals. Sports sandals have become popular in recent years, to enable active athletic activities to be performed while wearing the sandals. Examples of two types of such sports sandals are those disclosed in U.S. Pat. Nos. 4,584,782 and 4,793,075, to Thatcher. The structure in U.S. Pat. No. 4,793,075 employs an adjustable toe strap, an adjustable ankle strap, an adjustable heel strap, and a lateral strap anchored between the toe and heel straps slightly above and parallel to the outer edge of the sole as a critical feature. Adjustment of the individual straps, in combination with this critical lateral strap, is said to provide good retention of the sandal on the foot. Alternative sports sandal structures have included those with multiple lacings, and those with toe thongs. These, however, are not considered particularly comfortable, especially for active athletic activities.

Many other sandal strap arrangements have been marketed and/or proposed over the centuries, but most have not been useful for, or even intended to be used for, athletic activities. An athletic sandal must not only have good foot support and stability, but also capability of assured retention on the foot during vigorous activities.

It would be a significant advantage of a sport sandal to be able to quickly, with one movement, adjust all portions of the sandal to cause excellent fit for a particular size and shape foot, and to be able to simultaneously adjust all of the straps with one movement to further tighten the fit when extra vigorous activity is encountered, or to loosen the fit when less strenuous activity is envisioned.

SUMMARY OF THE INVENTION

Therefore, it is an object of this invention to provide a novel sport sandal construction which not only has proper stability and support for sporting activities, and secure foot retention, but also is capable of immediate tightening or loosening adjustment of all strap portions relative to the foot, with one quick adjustment. The novel structure employs a special strap combination having some relationship to a parachute harness, enabling one movement to fully adjust it.

A control strap is anchored to a ring on one side of the sole at the ankle region, extends forwardly with a slip fit through a centrally located ring on the forefoot strap at the metatarsal region, then rearwardly to an anchor strap ring on a second anchor strap at the outside of the sole, and then through this ring with a slip fit to double back forwardly and overlap the rearwardly extending portion, where it is adjustably fastened with hook and loop fastener strips. A heel strap also extends between the two anchor strap rings. A simple length adjustment of this control strap simultaneously adjusts not only the length and position of both strap portions on both sides of the foot, but also adjusts the distance between the heel strap and the center of the forefoot strap.

These and several other objects, advantages and features of the invention will become apparent upon studying the following specification in conjunction with the drawings.

BRIEF DESCRIPTION OF THE DRAWINGS

The figure is a perspective view of the novel sandal and strap arrangement.

DESCRIPTION OF THE PREFERRED EMBODIMENT

Referring now specifically to the drawing figure, the novel sandal and strap assembly 10 includes a sole member 12, typically of a flexible polymeric material, having a forefoot portion 14 and a heel portion 16. The forefoot portion includes a metatarsal span at its widest portion, corresponding to the metatarsal joint line of the foot. A forefoot strap 20 is anchored to the sole member on opposite sides of the metatarsal span to extend over the metatarsal portion of a foot. In the illustrated embodiment, it includes an anchor strap 22 on the lateral side of the metatarsal span, extending up to a D-ring 24 at the upper end of the anchor strap, and doubling back onto itself where it is secured together as by stitching. The portion of the strap extending over the foot comprises a separate strap segment 25 anchored on one end at the medial side of the metatarsal span, extending across the metatarsal joints and through the D-ring 24 to double back on itself where it preferably has an adjustable securement material such as a pair of hook and loop fastener strips 26, e.g., "Velcro" brand. Although this forefoot strap 20 is shown to be an adjustable member, it need not be, in accordance with the broader aspects of this invention.

The heel portion includes an ankle span of a width to accommodate the ankle of the wearer. Adjacent the ankle span on opposite sides thereof are spaced upstanding anchor straps, more specifically anchor strap 40 on the lateral side and anchor strap 42 on the medial side. These anchor straps extend around a pair of opposite triangular shaped rings 44 and 46 respectively, at the upper ends of these anchor straps and specifically about one leg of the triangle and then each doubling back on itself where it is secured together as by stitching. A heel strap 60 extends rearwardly around the heel of a foot on the sole and has its opposite ends secured to rings 44 and 46 as by extending through the rings and being doubled back on itself where it is secured as by stitching, or if desired by an adjustable fastener such as hook and loop strips.

A special control strap generally indicated at 70 extends along both sides of the structure and any foot therein. This control strap extends forwardly inwardly from anchor ring 46 to which it is secured, to and through ring 28 which is located centrally of forefoot strap 20. Control strap 70 has a medial portion 72 which extends along the medial side of the sandal and foot, through ring 28 with a slide fit, and then has a lateral portion which extends rearwardly along the lateral side of the sandal, and of any foot thereon, to anchor ring 44 with which it also fits with a slide fit. The strap has a portion 76 that doubles back upon the rearwardly extending portion 74, on the outside thereof, for a variable adjustment securement thereto, preferably by an attachment means which comprises a pair of hook and loop strips 80 as of the "Velcro" brand.

When a foot is placed on the sandal sole 12 within the strap assembly, a single adjustment of control strap 70 will cause the components to be secured to the foot. Specifically, a single movement shortening control strap 70 at fastener 80 causes the control strap to slip through ring 44 and centrally located front ring 28, to pull the forefoot strap toward the rear and pull the rear rings 44 and 46, and heel strap 60 toward the front, thereby tightening heel strap 60, forefoot strap 20, and causing the control strap on opposite sides of the foot to move laterally inwardly toward the foot. The distance between heel strap 60 and forefoot strap 20 is thereby varied. This one adjustment simultaneously causes all of the straps to move. Moreover, if a sport activity of particularly vigorous nature is to be encountered, the entire strap assembly can be snugged even further by disconnecting the Velcro fastener 80, pulling forwardly extending portion 76 more tightly, and then refastening fastener 80. If an activity of less vigor is to be encountered, the entire strap assembly can be loosened by loosening fastener 80, allowing the control strap to be lengthened on both sides of the foot, and resecuring fastener 80.

Optionally, the length of forefoot strap 20 and heel strap 60 can be adjusted to suit a particular foot during the initial fitting, but this normally does not need adjustment thereafter. Thereafter, adjustment of control strap 70 will cause appropriate adjustment to the inside and outside of the ankle, as well as control the distance between the heel strap and forefoot strap.

It is not intended that the invention is to be limited specifically to the preferred embodiment set forth as illustrative, but only by the scope of the appended claims and the reasonably equivalent structures to those defined therein.

The embodiments of the invention in which an exclusive property or privilege is claimed are defined as follows:

1. A sport sandal comprising:

a sole member having a forefoot portion and a heel portion, said forefoot portion including a metatarsal span, and said heel portion including an ankle span;

a forefoot strap anchored to said sole member on opposite sides of said metatarsal span to extend over the metatarsal portion of a foot, and having a ring centrally thereof;

a pair of upstanding anchor straps mounted to said sole member on opposite sides of said ankle span and each having a ring on the upper end thereof;

a heel strap attached at its opposite ends to said anchor strap rings to extend around the heel of a foot;

a control strap attached to and extending from one of said anchor strap rings, forwardly with a slide fit through said forefoot strap ring, and with a portion extending rearwardly from said forefoot strap ring to and through the outer said anchor strap ring with a slide fit, and then having a doubled back portion overlapping said rearwardly extending portion;

said doubled back portion having variable fastening means to said rearwardly extending portion for length adjustment of said control strap, whereby adjustment of the length of said control strap causes said forefoot strap, said heel strap and said control strap to all simultaneously be adjusted to a particular foot on said sole member.

2. The sport sandal in claim 1 wherein said variable fastening means comprises hook and loop strips on said doubled back portion and said rearwardly extending portion.

3. The sport sandal in claim 1 wherein said forefoot strap includes a ring and a doubled back portion to be length adjustable.

4. The sport sandal in claim 2 wherein said anchor strap rings are triangular to each readily accommodate one of said anchor straps, as well as said heel strap and said control strap.

5. The sport sandal in claim 1 wherein said sole member has a medial side and a lateral side, and said control strap is anchored to the one of said anchor rings on said medial side, extends forwardly to a slide fit with said centrally located ring on said forefoot strap, and rearwardly to the other of said anchor rings on said lateral side, and said variable fastening means is on said lateral side of said sole member.

*6. A sport sandal comprising:*

*a sole member having a forefoot portion and a heel portion, said forefoot portion including a metatarsal span, and said heel portion including an ankle span;*

*a forefoot strap anchored to said sole member on opposite sides of said metatarsal span to extend over the metatarsal portion of a foot, and having a ring centrally thereof;*

*a pair of upstanding anchor straps mounted to said sole member on opposite sides of said ankle span, a first of said anchor straps having a slide fit means at the upper end thereof for receiving a control strap with a slide fit;*

*a heel strap attached at its opposite ends to said anchor straps to extend around the heel of a foot;*

*a control strap attached to and extending from a second of said anchor straps, forwardly with a slide fit through said forefoot strap ring, and with a portion extending rearwardly from said forefoot strap ring to said slide fit means with a slide fit, and then having a doubled back portion overlapping said rearwardly extending portion; and*

*said doubled back portion having variable fastening means to said rearewardly extending portion for length adjustment of said control strap, whereby adjustment of the length of said control strap causes said forefoot strap, said heel strap and said control strap to all simultaneously be adjusted to a particular foot on said sole member.*

*7. The sport sandal in claim 6 wherein said variable fastening means comprises hook and loop strips on said doubled back portion and said rearwardly extending portion.*

*8. The sport sandal in claim 6 wherein said forefoot strap includes a ring and a doubled back portion to be length adjustable.*

*9. The sport sandal in claim 6 wherein said sole member has a medial side and a lateral side, and said control strap is anchored to the one of said anchor straps on said medial side, extends forwardly to a slide fit with said centrally located ring on said forefoot strap, and rearwardly to the other of said anchor straps on said lateral side, and said variable fastening means is on said lateral side of said sole member.*

*10. A sport sandal comprising:*

*a sole member having a forefoot portion and a heel portion, said forefoot portion including a metatarsal span, and said heel portion including an ankle span;*

*a forefoot strap anchored to said sole member on opposite sides of said metatarsal span to extend over the metatarsal portion of a foot, and having a ring centrally thereof;*

*a pair of upstanding anchor straps mounted to said sole member on opposite sides of said ankle span, a first of said anchor straps having a ring on the upper end thereof;*

*a heel strap attached at its opposite ends to said anchor straps to extend around the heel of a foot;*

*a control strap attached to and extending from a second of said anchor straps, forwardly with a slide fit through said forefoot strap ring, and with a portion extending rearwardly from said forefoot strap ring to and through said anchor strap ring on said first anchor strap with a slide fit, and then having a doubled back portion overlapping said rearwardly extending portion; and*

*said doubled back portion having variable fastening means to said rearwardly extending portion for length adjustment of said control strap, whereby adjustment of the length of said control strap causes said forefoot strap, said heel strap and said control strap to all simultaneously be adjusted to a particular foot on said sole member.*

*11. The sport sandal in claim 10 wherein said variable fastening means comprise hook and loop strips on said doubled back portion and said rearwardly extending portion.*

*12. The sport sandal in claim 10 wherein said forefoot strap includes a ring and a doubled back portion to be length adjustable.*

*13. The sport sandal in claim 11 wherein said anchor strap ring is triangular to readily accommodate one of said anchor straps, as well as said heel strap and said control strap.*

*14. The sport sandal in claim 10 wherein said sole member has a medial side and a lateral side, and said control strap is anchored to the one of said anchor straps on said medial side, extends forwardly to a slide fit with said centrally located ring on said forefoot strap, and rearwardly to said anchor ring on the other said anchor strap on said lateral side, and said variable fastening means is on said lateral side of said sole member.*

* * * * *